US011811990B2

(12) United States Patent
Takamatsu

(10) Patent No.: US 11,811,990 B2
(45) Date of Patent: Nov. 7, 2023

(54) MULTI-FEED DETECTION DEVICE, TRANSPORT DEVICE, AND IMAGE READING DEVICE

(71) Applicant: SEIKO EPSON CORPORATION, Tokyo (JP)

(72) Inventor: Seiji Takamatsu, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/054,279

(22) Filed: Nov. 10, 2022

(65) Prior Publication Data

US 2023/0156131 A1 May 18, 2023

(30) Foreign Application Priority Data

Nov. 12, 2021 (JP) ................................. 2021-184774

(51) Int. Cl.
*H04N 1/00* (2006.01)

(52) U.S. Cl.
CPC ..... *H04N 1/00628* (2013.01); *H04N 1/00013* (2013.01); *H04N 1/00037* (2013.01); *H04N 1/00082* (2013.01); *H04N 1/00602* (2013.01); *H04N 1/00615* (2013.01)

(58) Field of Classification Search
CPC ............ H04N 1/00689; H04N 1/0057; H04N 1/00745; H04N 2201/0081; H04N 1/00; H04N 1/00774; H04N 1/00779; H04N 1/00602; H04N 1/00588; H04N 1/00628; H04N 1/00692; H04N 1/00705; H04N 1/00734; H04N 1/00798; H04N 1/121; H04N 1/2032; H04N 1/40; H04N 1/40056; H04N 1/00095; H04N 1/00562; H04N 1/00708; H04N 1/00726; H04N 1/00771; H04N 1/00795; H04N 1/00801; H04N 1/00037; H04N 1/00615; H04N 1/00702; B65H 5/062; B65H 7/125; B65H 1/14; B65H 1/18; B65H 2511/20; B65H 2511/30; B65H 2553/21; B65H 2557/34; B65H 2701/1131; B65H 2801/39; B65H 7/02; B65H 2220/01; B65H 2220/03; B65H 2220/11; B65H 2511/524; B65H 29/125; B65H 2515/70; G01V 8/12; G03G 15/602; G03G 15/6529; G06T 3/40
USPC ....................................... 358/1.15
See application file for complete search history.

(56) References Cited

U.S. PATENT DOCUMENTS

| | | | | |
|---|---|---|---|---|
| 8,223,117 B2 * | 7/2012 | Ferguson | ............. | G09G 3/3406 345/207 |
| 9,831,868 B2 * | 11/2017 | Otsuka | ................. | B41J 2/04541 |
| 2007/0124620 A1 * | 5/2007 | Miyazaki | ............. | H03F 3/2173 713/323 |

(Continued)

FOREIGN PATENT DOCUMENTS

JP    2018-162154 A    10/2018

*Primary Examiner* — Negussie Worku
(74) *Attorney, Agent, or Firm* — WORKMAN NYDEGGER

(57) ABSTRACT

A drive circuit including a push-pull circuit is a circuit in which a converted signal whose voltage level is inverted compared with a reference signal is input to the gate terminal of a first N-type MOSFET, and the reference signal is input to the gate terminal of a second N-type MOSFET. A second adjustment circuit advances the falling timing of the converted signal input to the gate terminal of the first N-type MOSFET.

9 Claims, 8 Drawing Sheets

(56) References Cited

U.S. PATENT DOCUMENTS

| | | | |
|---|---|---|---|
| 2008/0116752 A1* | 5/2008 | Kuroda | G07C 9/00309 |
| | | | 307/125 |
| 2012/0057212 A1* | 3/2012 | Tobinaga | B65H 3/0684 |
| | | | 271/118 |
| 2016/0193828 A1* | 7/2016 | Hirakawa | B41J 2/04508 |
| | | | 310/317 |
| 2016/0254811 A1* | 9/2016 | Otsuka | H03K 17/6871 |
| | | | 327/111 |
| 2017/0126914 A1* | 5/2017 | Koyanagi | H04N 1/00689 |
| 2017/0374216 A1* | 12/2017 | Kanamitsu | H04N 1/00795 |
| 2021/0218854 A1* | 7/2021 | Yoshiwara | H04N 1/00615 |
| 2022/0239793 A1* | 7/2022 | Itabashi | H04N 1/00602 |
| 2022/0263962 A1* | 8/2022 | Murahashi | G01V 8/12 |
| 2023/0164278 A1* | 5/2023 | Yoshiwara | H04N 1/00602 |
| | | | 358/1.5 |

* cited by examiner

MULTI-FEED DETECTION DEVICE, TRANSPORT DEVICE, AND IMAGE READING DEVICE

The present application is based on, and claims priority from JP Application Serial Number 2021-184774, filed Nov. 12, 2021, the disclosure of which is hereby incorporated by reference herein in its entirety.

BACKGROUND

1. Technical Field

The present disclosure relates to a multi-feed detection device for detecting multi-feed of a medium, a transport device, and an image reading device.

2. Related Art

For example, JP-A-2018 162154 discloses an image reading device capable of reading an image on a medium, that includes an acoustic wave sensor configured from a transmission element and a reception element, and a drive circuit for driving the acoustic wave sensor. Such an image reading device can detect, for example, multi-feed of medium using the acoustic wave sensor. A drive circuit for driving the acoustic wave sensor includes a push-pull circuit using an N-type MOSFET and a P-type MOSFET in order to amplify current.

However, in such a device, between an N-type MOSFET and a P-type MOSFET used in a drive circuit, the P-type MOSFET tends to have a slower drive speed than the N-type MOSFET. For this reason, the driving speed of the push-pull circuit that uses an N-type MOSFET and a P-type MOSFET is slow, and it is desirable to increase the driving speed of the push-pull circuit.

SUMMARY

A multi-feed detection device that solves the above-described problem includes a transmission element configured to transmit a signal for detecting multi-feed of a medium, a reception element configured to receive a signal for detecting multi-feed of the medium, a drive circuit configured to output a drive signal to the transmission element, and a control circuit configured to detect multi-feed of the medium based on a signal received by the reception element, wherein the drive circuit includes a conversion circuit configured to convert a reference signal into a converted signal, a booster circuit configured to boost the converted signal that was converted by the conversion circuit, a first adjustment circuit configured to adjust rising time of the converted signal that was boosted by the booster circuit to be longer, a push-pull circuit that outputs a drive signal obtained by amplifying current of the converted signal that was adjusted by the first adjustment circuit, and a second adjustment circuit configured to adjust the converted signal to be input to the push-pull circuit, the converted signal that was converted by the conversion circuit is a signal whose voltage level is inverted compared with the reference signal, the push-pull circuit includes a first N-type MOSFET and a second N-type MOSFET, and is a circuit wherein a source terminal of the first N-type MOSFET and a drain terminal of the second N-type MOSFET are coupled to each other, the drive circuit is a circuit in which the converted signal that was adjusted by the first adjustment circuit is input to a gate terminal of the first N-type MOSFET and the reference signal is input to a gate terminal of the second N-type MOSFET, and the second adjustment circuit advances a falling timing of the converted signal to be input to the gate terminal of the first N-type MOSFET.

A transport device that solves the above-described problem includes the above-described multi-feed detection device and a transport section configured to transport the medium.

According to another aspect of the present disclosure, there is provided an image reading device including the above-described multi-feed detection device and a reading section configured to read an image on a medium.

DESCRIPTION OF EMBODIMENTS

First Embodiment

Hereinafter, an embodiment of an image reading device as an example of a multi-feed detection device and a transport device will be described. The image reading device is a device that reads an image from a medium.

Configuration of Image Reading Device

Figure 1:
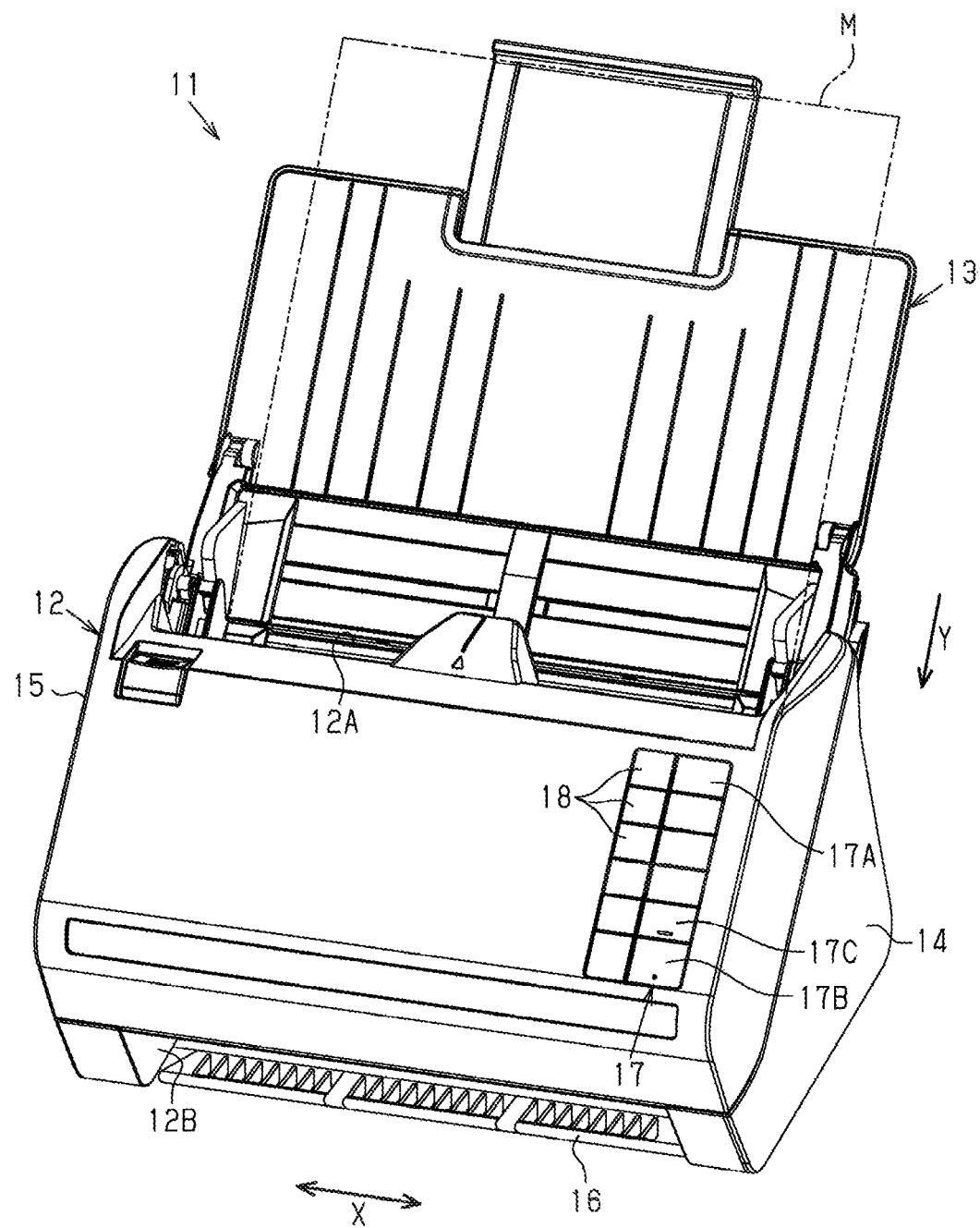
FIG. 1 is a perspective view showing an image reading device.

As shown in FIG. 1, the image reading device 11 includes a main body 12. The main body 12 may have a substantially trapezoidal shape in a side view. The main body 12 is provided with a feed port feed port 12A opened at an upper part. The main body 12 is provided with a discharge port 12B opened in a front lower part.

The image reading device 11 may include a medium support 13. The medium M can be placed on the medium support 13. The medium M placed on the medium support 13 is a medium before image reading. The image reading device 11 feeds the medium M placed on the medium support 13 from the feeding port 12A into the main body 12.

The main body 12 includes a main body section 14 and a cover section 15. The cover section 15 may be rotatably coupled about a front end portion of the main body section 14.

The main body section 14 includes a stacker 16. The stacker 16 is provided on the lower side of the discharge port 12B. The stacker 16 is slidable in the front-rear direction. The medium M discharged from the discharge port 12B can be placed on the stacker 16. The medium M discharged from the discharge port 12B is a medium after image reading. In this manner, the image reading device 11 discharges the medium M from which the image has been read from the discharge port 12B to the stacker 16.

In the drawings, a direction in which the medium M is transported is shown as a transport direction Y, and a direction orthogonal to the transport direction Y is shown as a width direction X. In addition, the width direction X is a main scanning direction when the image reading device 11 reads an image of the medium M, and the transport direction Y is a sub-scanning direction.

The main body 12 includes an operation section 17. The operation section 17 is provided on the front surface of the cover section 15. The operation section 17 includes a plurality of switches that can be operated by the user. The plurality of switches include a power switch 17A, a start switch 17B, and a stop switch 17C.

The main body 12 includes a notification section 18. The notification section 18 is provided at a position adjacent to the operation section 17. The notification section 18 may be, for example, an indicator light such as an LED, or may be a display device including a liquid crystal panel or the like. The notification section 18 notifies the user of necessary information such as whether the power supply is on or off.

Transport Path

Figure 2:
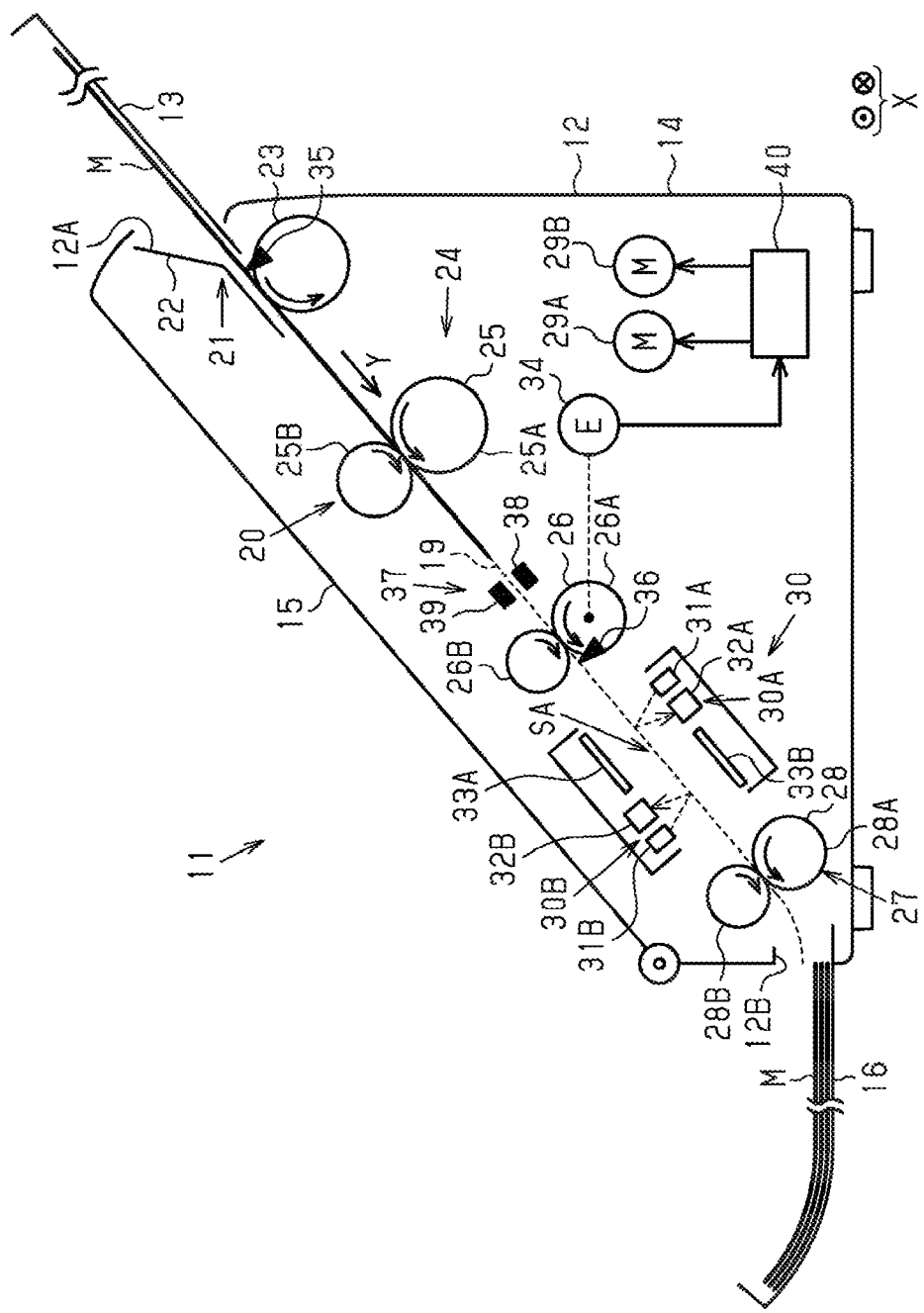
FIG. 2 is a schematic side sectional view showing the image reading device.

As shown in FIG. 2, the image reading device 11 includes a transport path 19. The transport path 19 is provided inside the main body 12. The transport path 19 is a path along which the medium M is transported. The transport path 19 includes a reading region SA. The reading region SA is an area for reading an image from the medium M.

The image reading device 11 includes a transport mechanism 20. The transport mechanism 20 is provided inside the main body 12. The transport mechanism 20 transports the medium M along the transport path 19. The transport mechanism 20 transports the medium M so as to pass through the reading region SA.

The transport mechanism 20 includes a feeding section 21. The feeding section 21 feeds a plurality of medium M placed on the medium support 13 into the main body 12 one by one. The feeding section 21 includes a feeding guide 22. The feeding guide 22 guides the medium M fed from the medium support 13 to the inside of the main body 12. The feeding section 21 includes one feeding roller 23. The feed roller 23 is provided at an upstream end of the transport path 19 in the main body 12. The feed roller 23 is one pickup roller opposed to the feed guide 22. The feeding section 21 feeds a plurality of medium M stacked on the medium support 13 one by one from the feeding port 12A along the feeding guide 22.

The transport mechanism 20 includes a transport section 24. The transport section 24 is configured to transport the medium M fed by the feeding section 21 along the transport path 19.

The transport section 24 includes a feed roller pair 25. The feed roller pair 25 is provided downstream of the feed roller 23 in the transport direction Y. The feed roller pair 25 includes a feed driving roller 25A and a feed separation roller 25B. A friction coefficient of an outer peripheral surface of the feeding separation roller 25B with respect to the medium M is larger than that of the feeding driving roller 25A. The feed separation roller 25B rotates at a slightly lower rotational speed than the feed driving roller 25A. Accordingly, even if a plurality of sheets of the medium M together are multi-fed from the feeding roller 23, the feeding roller pair 25 separates the lowermost one sheet and feeds the lowermost sheet to the downstream in the transport direction Y.

The transport section 24 includes a transport roller pair 26. The transport roller pair 26 is provided downstream of the feed roller pair 25 in the transport direction Y. The transport roller pair 26 is provided upstream of the reading region SA in the transport direction Y. The transport roller pair 26 includes a transport driving roller 26A and a transport driven roller 26B. The transport roller pair 26 is rotationally driven so as to transport the medium M at the same transport speed when reading the medium M. The transport driven roller 26B is rotated by the rotation of the transport driving roller 26A.

The transport mechanism 20 includes a discharge section 27. The discharge section 27 discharges the medium M after image reading. The discharge section 27 includes a discharge roller pair 28. The discharge roller pair 28 is provided downstream of the reading region SA in the transport direction Y. The discharge roller pair 28 transports the medium M during reading together with the transport roller pair 26. The discharge roller pair 28 includes a discharge driving roller 28A and a discharge driven roller 28B. The discharge roller pair 28 is rotationally driven so as to transport the medium M at the same transport speed when the medium M is read. The discharge driven roller 28B is rotated by the rotation of the discharge driving roller 28A.

The image reading device 11 includes a feeding motor 29A and a transport motor 29B. The feeding motor 29A is a power source for rotationally driving the feeding roller 23 and the feeding driving roller 25A. The transport motor 29B is a power source for rotationally driving the feed separation roller 25B, the transport driving roller 26A, and the discharge driving roller 28A.

The image reading device 11 includes a reading section 30. The reading section 30 is provided inside the main body 12. The reading section 30 is configured to read an image of the medium M transported along the transport path 19. The reading section 30 is provided between the transport roller pair 26 and the discharge roller pair 28 in the transport direction Y.

The reading section 30 may include a first reading section 30A and a second reading section 30B. The first reading section 30A reads the front side of the medium M. The second reading section 30B reads the back surface of the medium M. The first reading section 30A and the second reading section 30B are provided to both sides so as to sandwich the transport path 19. The first reading section 30A and the second reading section 30B are provided at positions slightly shifted from each other in the transport direction Y. When only the front side of the medium M is read, the first reading section 30A performs a reading operation, and the second reading section 30B does not perform a reading operation. In a case of reading both sides of the medium M, the first reading section 30A and the second reading section 30B perform a reading operation.

The first reading section 30A includes a first light source 31A. The first light source 31A can irradiate the medium M being transported with light. The first light source 31A is composed of, for example, LEDs or fluorescent lamps.

The first reading section 30A includes a first image sensor 32A. The first image sensor 32A extends in the widthwise direction X. The first image sensor 32A is, for example, a linear image sensor. The first image sensor 32A may be a contact-type image sensor in which a plurality of photoelectric conversion elements are arranged in a line along the widthwise direction X. In detail, the first image sensor 32A may be a complementary metal oxide semiconductor (CMOS) image sensor. The first image sensor 32A receives light reflected by the medium M from the light from the first light source 31A. The first image sensor 32A converts the light received by each photoelectric conversion element into an electric signal and outputs a pixel signal having a value corresponding to the amount of received light. The image reading device 11 may be capable of color scanning and monochrome scanning (gray scale scanning).

The first reading section 30A includes a first color reference plate 33A. The first color reference plate 33A is provided at a position facing the first image sensor 32A with the transport path 19 interposed therebetween. The first color reference plate 33A is used to obtain a white reference value for shading correction.

The second reading section 30B has the same function as the first reading section 30A. Therefore, detailed description of the second reading section 30B will be omitted. The second reading section 30B includes a second light source 31B, a second image sensor 32B, and a second color reference plate 33B. The second light source 31B has the same function as the first light source 31A. The second image sensor 32B has the same function as the first image sensor 32A. The second color reference plate 33B has the same function as the first color reference plate 33A.

The image reading device 11 includes an encoder 34. The encoder 34 is provided inside the main body 12. The encoder 34 may be, for example, a rotary encoder. The encoder 34 may be capable of detecting the rotation of the transport driving roller 26A, but may be capable of detecting the rotation of another roller. The encoder 34 outputs a detection signal including pulses whose number is proportional to the rotation amount of the driving roller.

The image reading device 11 includes a first medium sensor 35. The first medium sensor 35 is provided slightly upstream of the feed roller 23 in the transport direction Y. The first medium sensor 35 detects the presence or absence of the medium M and outputs a detection signal. The first medium sensor 35 may be, for example, a contact sensor having a lever, but may be a non-contact sensor such as an optical sensor. When the medium M is placed on the medium support 13, the placed medium M presses the lever, and thus the first medium sensor 35 detects the presence of the medium M placed on the medium support 13.

The image reading device 11 includes a second medium sensor 36. The second medium sensor 36 is provided slightly downstream in the transport direction Y of the nip point of the transport roller pair 26. The second medium sensor 36 detects the presence or absence of the medium M and outputs a detection signal. The second medium sensor 36 may be, for example, a contact sensor having a lever, but may be a non-contact sensor such as an optical sensor. When the medium M is transported by the transport roller pair 26, the leading end of the medium M presses the lever, and thus the second medium sensor 36 detects the presence of the medium M transported by the transport roller pair 26. After the medium M is transported by the transport roller pair 26 and the trailing end of the medium M passes through, the lever is not pressed, and thus the second medium sensor 36 detects that there is no medium M transported by the transport roller pair 26.

The image reading device 11 includes a multi-feed sensor 37. The multi-feed sensor 37 is provided between the feed driving roller 25A and the transport driving roller 26A in the transport direction Y. The multi-feed sensor 37 detects multi-feed of the medium M. Multi-feed of the medium M means that a plurality of medium M are transported in an overlapped state.

The multi-feed sensor 37 includes a transmission element 38 and a reception element 39. The transmission element 38 is an element capable of transmitting a signal for detecting multi-feed of the medium M. The reception element 39 is an element capable of receiving a signal for detecting multi-feed of the medium M. The transmission element 38 and the reception element 39 are provided at positions facing each other with the transport path 19 interposed therebetween. The signal for detecting the multi-feed of the medium M is a sound wave, and the multi-feed sensor 37 may be, for example, a sound wave type sensor.

Controller

The image reading device 11 includes a controller 40. The controller 40 may perform overall control the image reading device 11 and control various operations executed by the image reading device 11. The controller 40 may include one or more processors that execute various processes in accordance with a computer program, one or more dedicated hardware circuits such as an application specific integrated circuit that executes at least a portion of the various processes, or a combination thereof. The processor includes a CPU and memory, such as RAM and ROM, which stores program code or instructions configured to cause the CPU to perform processing. The memory, that is, the computer-readable medium includes any readable medium that can be accessed by a general purpose or special purpose computer.

The controller 40 is coupled to the operation section 17. The controller 40 receives an operation signal from the operation section 17. The controller 40 is coupled to the encoder 34. The controller 40 receives a detection signal from the encoder 34. The controller 40 is coupled to the first medium sensor 35. The controller 40 receives a detection signal from the first medium sensor 35. The controller 40 is coupled to the second medium sensor 36. The controller 40 receives a detection signal from the second medium sensor 36. The controller 40 is coupled to the multi-feed sensor 37. The controller 40 receives a detection signal from the multi-feed sensor 37.

The controller 40 is coupled to the feeding motor 29A. The controller 40 outputs a drive signal to the feeding motor 29A. The controller 40 is coupled to the transport motor 29B. The controller 40 outputs a drive signal to the transport motor 29B.

The controller 40 is coupled to the first reading section 30A. The controller 40 inputs the pixel signal by driving and controlling the first reading section 30A. The controller 40 is coupled to the second reading section 30B. The controller 40 inputs a pixel signal by driving and controlling the second reading section 30B.

Specifically, in a case where the input of the reading job is specified based on the operation signal from the operation section 17, the controller 40 controls the image reading device 11 based on the reading instruction. When controlling the reading operation, the controller 40 controls the feeding motor 29A, the transport motor 29B, the first reading section 30A, and the second reading section 30B.

In a case where the input of the reading job is specified, the controller 40 determines whether or not the medium M is placed on the medium support 13 based on the detection signal from the first medium sensor 35. In a case where it is determined that the medium M is placed on the medium support 13, the controller 40 initializes a transport counter. The transport counter is assigned to the memory. The transport counter is a counter for specifying the position of the medium M in the transport direction Y. The controller 40 updates the transport counter based on the detection signal input from the encoder 34 during driving of the transport motor 29B. In this case, the controller 40 specifies the position of the medium M in the transport direction Y based on the updated transport counter value.

The controller 40 specifies that the leading end of the medium M has passed through the transport roller pair 26 based on the detection signal from the second medium sensor 36. The controller 40 detects that the trailing end of the medium M has passed through the transport roller pair 26 based on the detection signal from the second medium sensor 36. The controller 40 specifies the start timing of the reading operation in the first reading section 30A and the second reading section 30B based on the timing at which the leading end of the medium M passes through the transport roller pair 26 and the timing at which the trailing end of the medium M passes through the transport roller pair 26. In addition, the controller 40 specifies the end timing of the reading operation based on the timing at which the leading end of the medium M passes through the transport roller pair 26 and the timing at which the trailing end of the medium M passes through the transport roller pair 26.

The controller 40 controls the reading operations of the first reading section 30A and the second reading section 30B based on the start timing of the reading operation and the end timing of the reading operation. In particular, when a reading instruction to read only the front side of the medium M is input, the controller 40 causes the first reading section 30A to perform the reading operation. In a case where a reading instruction to read both sides of the medium M is input, the controller 40 causes the first reading section 30A and the second reading section 30B to perform a reading operation.

Multi-Feed Detection Circuit

Here, an electrical configuration for controlling the multi-feed sensor 37 will be described with reference to FIG. 3.

Figure 3:
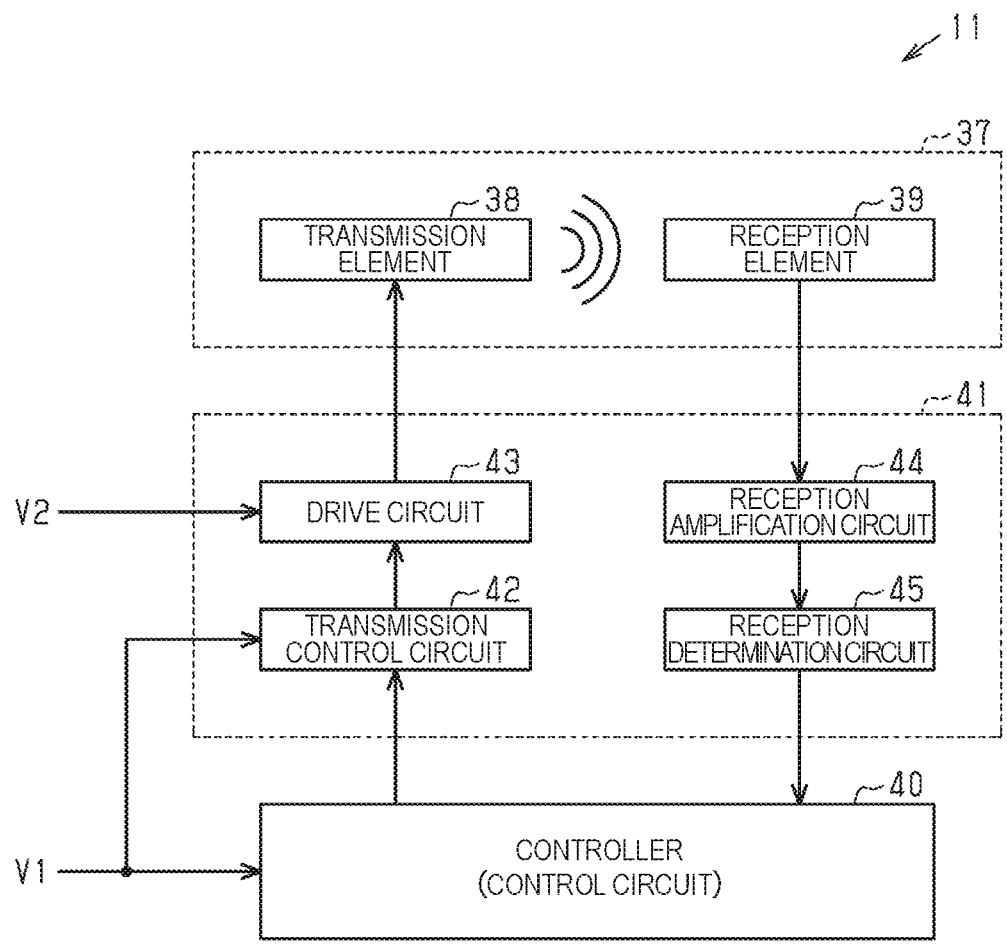
FIG. 3 is a block diagram illustrating a multi-feed detection sensor, a multi-feed detection circuit, and a controller.

As shown in FIG. 3, the image reading device 11 includes a multi-feed detection circuit 41. The multi-feed detection circuit 41 is coupled to the controller 40. The multi-feed detection circuit 41 is coupled to the transmission element 38. The multi-feed detection circuit 41 is coupled to the reception element 39.

The controller 40 can output a valid signal to the multi-feed detection circuit 41. When the valid signal is input from the controller 40, the multi-feed detection circuit 41 outputs a drive signal to the transmission element 38, and causes the transmission element 38 to transmit a sound wave. The multi-feed detection circuit 41 outputs a detection signal to the controller 40 based on the sound wave received by the reception element 39. The controller 40 can detect multi-feed of the medium M based on the input of the detection signal. In this manner, the controller 40 is configured to detect multi-feed of the medium M.

The first power supply voltage V1 and the second power supply voltage V2 are supplied to the multi-feed detection circuit 41. The first power supply voltage V1 is a voltage for overall control of the image reading device 11. The second power supply voltage V2 is a drive voltage for driving the transmission element 38. The second power supply voltage V2 is higher than the first power supply voltage V1. The first power supply voltage V1 of the present embodiment may be, for example, 3.3 V. The second power supply voltage V2 of the present embodiment may be, for example, 24 V. The first power supply voltage V1 is also supplied to the controller 40. In this way, the controller 40 is a circuit to which the first power supply voltage V1 is supplied.

The multi-feed detection circuit 41 may include a transmission control circuit 42. The first power supply voltage V1 is supplied to the transmission control circuit 42. In this way, the transmission control circuit 42 is a circuit to which the first power supply voltage V1 is supplied. When the valid signal is input from the controller 40, the transmission control circuit 42 outputs a reference signal based on the first power supply voltage V1. The reference signal is a rectangular wave in which the first power supply voltage V1 is the high level and 0 V is the low level.

The multi-feed detection circuit 41 includes a drive circuit 43. The second power supply voltage V2 is supplied to the drive circuit 43. In this way, the drive circuit 43 is a circuit to which is supplied the second power supply voltage V2, which is higher than the first power supply voltage V1. The drive circuit 43 is coupled to the transmission control circuit 42. The drive circuit 43 is coupled to the transmission element 38. The drive circuit 43 is a circuit for causing the transmission element 38 to transmit a sound wave. A reference signal is input from the transmission control circuit 42 to the drive circuit 43. When the reference signal is input from the transmission control circuit 42, the drive circuit 43 generates a drive signal using the second power supply voltage V2 and outputs the drive signal to the transmission element 38. In this way, the drive circuit 43 is configured to output a drive signal to the transmission element 38.

The multi-feed detection circuit 41 includes a reception amplification circuit 44. The reception amplification circuit 44 is coupled to the reception element 39. The reception amplification circuit 44 amplifies a voltage of a reception signal from the reception element 39 and outputs the amplified voltage. In this way, the reception amplification circuit 44 is configured to amplify the voltage of the signal received by the reception element 39.

The multi-feed detection circuit 41 includes a reception determination circuit 45. The reception determination circuit 45 is coupled to the reception amplification circuit 44. The reception determination circuit 45 is coupled to the controller 40. When a reception signal whose voltage has been amplified by the reception amplification circuit 44 is input from the reception amplification circuit 44, the reception determination circuit 45 outputs a detection signal to the controller 40 when the reception signal satisfies a detection condition. The detection condition may be satisfied when the amplitude value of the reception signal is within a specified range. In this way, the reception determination circuit 45 is configured to determine the signal amplified by the reception amplification circuit 44.

The controller 40 outputs a valid signal to the transmission control circuit 42 to drive the multi-feed sensor 37. When the detection signal is input from the reception determination circuit 45, the controller 40 detects multi-feed of the medium M. In this way, the controller 40 is configured to detect multi-feed of the medium M based on the result determined by the reception determination circuit 45. That is, the controller 40 is configured to detect multi-feed of the medium M based on the signal received by the reception element 39. In the present embodiment, the controller 40 corresponds to an example of a control circuit.

Drive Circuit 43

Next, the drive circuit 43 will be described with reference to FIG. 4.

Figure 4:
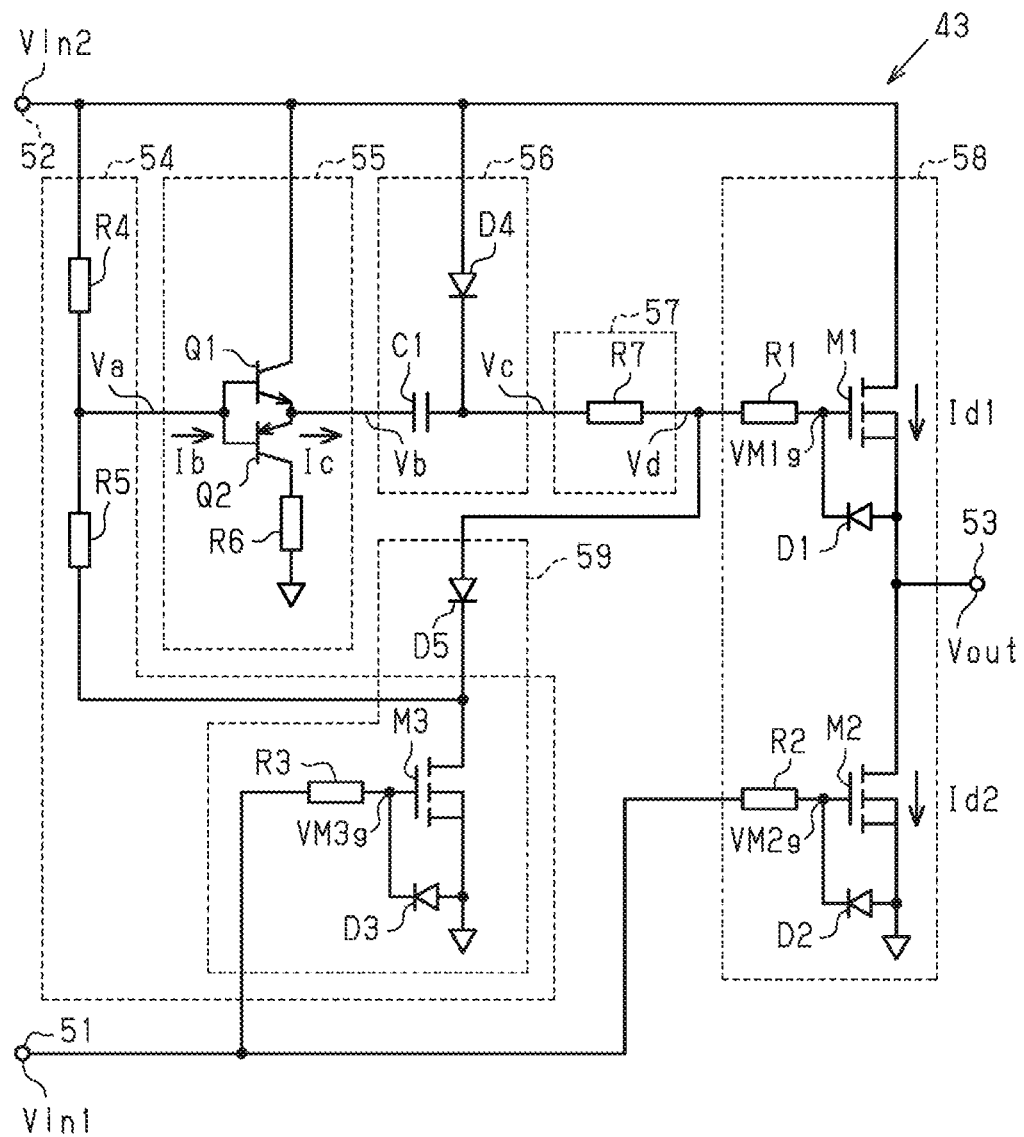
FIG. 4 is a circuit diagram showing a drive circuit.

As shown in FIG. 4, the drive circuit 43 includes a first input terminal 51. The reference signal Vin1 is input from the transmission control circuit 42 to the first input terminal 51. The reference signal Vin1 is, for example, a rectangular wave in which 3.3V as the first power supply voltage V1 is the high level and 0 V is he low level. The drive circuit 43 includes a second input terminal 52. The drive power supply Vin2 of the second power supply voltage V2 is supplied to the second input terminal 52. The drive power supply Vin2 is, for example, 24V DC as the second power supply voltage V2. The drive circuit 43 includes an output terminal 53. A drive signal Vout for driving the transmission element 38 is output from the output terminal 53. The drive signal Vout is, for example, a rectangular wave in which 24 V as the second power supply voltage V2 is the high level and 0 V is the low level.

Conversion Circuit 54

The drive circuit 43 includes a conversion circuit 54. The conversion circuit 54 is a circuit that converts the reference signal Vin1 into a converted signal. The reference signal Vin1 is a signal within a first voltage range. The first voltage range is a range equal to or lower than the first power supply voltage V1, for example, 0 to 3.3 V. The converted signal converted by the conversion circuit 54 is a voltage within a second voltage range. The second voltage range is a range equal to or lower than the second power supply voltage V2, such as 0 to 24 V. The converted signal is a signal that becomes a low level when the reference signal Vin1 is a high level and becomes a high level when the reference signal Vin1 is a low level. That is, the converted signal is a signal whose voltage level is inverted compared with the reference signal Vin1.

The conversion circuit 54 may include resistances R4 and R5, a third switching element M3, a third gate resistance R3, and a diode D3. The third switching element M3 may be an N-type MOSFET. One end of the resistance R4 is coupled to the second input terminal 52. The other end of the resistance R4 is coupled to one end of the resistance R5. The other end of the resistance R4 and the one end of the resistance R5 are the output terminal of the conversion circuit 54. The other end of the resistance R5 is coupled to a drain terminal of the third switching element M3. One end of the third gate resistance R3 is coupled to the first input terminal 51. The one end of the third gate resistance R3 is an input terminal of the conversion circuit 54. The other end of the third gate resistance R3 is coupled to a gate terminal of the third switching element M3. That is, the third gate resistance R3 is coupled to the gate terminal of the third switching element M3. A source terminal of the third switching element M3 is grounded.

An anode terminal of the diode D3 and a source terminal of the third switching element M3 are coupled to each other. A cathode terminal of the diode D3 and the gate terminal of the third switching element M3 are coupled to each other. The diode D3 between the source terminal of the third switching element M3 and the gate terminal of the third switching element M3 protects the absolute maximum rating between the source terminal of the third switching element M3 and the gate terminal of the third switching element M3.

The reference signal Vin1 is input to the gate terminal of the third switching element M3 via the third gate resistance R3. When the reference signal Vin1 is at the high level, the third switching element M3 is in an ON state, and a drain current of the third switching element M3 flows. As a result, the voltage Va at the output terminal of the conversion circuit 54 becomes lower than the second power supply voltage V2. When the reference signal Vin1 is at a low level, the third switching element M3 is in the OFF state, and the drain current of the third switching element M3 does not flow. As a result, the voltage Va at the output terminal of the conversion circuit 54 becomes the second power supply voltage V2.

Thus, the conversion circuit 54 is configured to convert the reference signal, which is within the first voltage range, to a converted signal, which is within the second voltage range. The conversion circuit 54 converts the high-level reference signal Vin1 into a low-level converted signal, and converts the low-level reference signal Vin1 into a high-level converted signal. That is, the conversion circuit 54 is configured to convert the reference signal Vin1 into a converted signal having an inverted voltage level compared with the reference signal Vin1. Specifically, the conversion circuit 54 can convert the signal into a rectangular wave converted signal having a high level of about 24 V and a low level of about 12 V.

First Current Amplification Circuit 55

The drive circuit 43 may include a first current amplification circuit 55. The first current amplification circuit 55 is a circuit that amplifies the current of the converted signal converted by the conversion circuit 54. That is, it can be said that the first current amplification circuit 55 is a circuit that amplifies a current of a signal input to a push-pull circuit 58 (to be described later).

The first current amplification circuit 55 may include a switching element Q1, a switching element Q2, and a resistance R6. The switching element Q1 is a npn-type bipolar transistor. The switching element Q2 is a pnp bipolar transistor. The first current amplification circuit 55 is a push-pull circuit using an npn-type bipolar transistor and a pnp-type bipolar transistor.

The base terminal of the switching element Q1 and the base terminal of the switching element Q2 are coupled to the other end of the resistance R4 and the one end of the resistance R5. The base terminal of the switching element Q1 and the base terminal of the switching element Q2 are input terminal of the first current amplification circuit 55. That is, the output terminal of the conversion circuit 54 and the input terminal of the first current amplification circuit 55 are coupled to each other. The collector terminal of the switching element Q1 is coupled to the second input terminal 52. The emitter terminal of the switching element Q1 and the emitter terminal of the switching element Q2 are coupled to each other. The emitter terminal of the switching element Q1 and the emitter terminal of the switching element Q2 are the output terminal of the first current amplification circuit 55. The collector of the switching element Q2 is coupled to one end of the resistance R6. The other end of the resistance R6 is grounded.

As described above, the first current amplification circuit 55 can amplify the current Ib flowing through the input terminal of the first current amplification circuit 55 to the current Ic flowing through the output terminal of the first current amplification circuit 55. Specifically, the first current amplification circuit 55 can amplify, for example, a current Ib of about 1.2 mA to a current Ic of about 5.2 mA in accordance with rising of the converted signal. This makes it possible to increase the capacitance of the capacitor C1 (to be described later) and to use a switching element having high processing capability as the first switching element M1 (to be described later).

Booster Circuit 56

The drive circuit 43 includes a booster circuit 56. The booster circuit 56 is a circuit that boosts the converted signal whose current was amplified by the first current amplification circuit 55. In other words, the booster circuit 56 is also a circuit that boosts the converted signal converted by the conversion circuit 54.

The booster circuit 56 may include a capacitor C1 and a diode D4. One end of the capacitor C1 is coupled to the emitter terminal of the switching element Q1 and to the emitter terminal of the switching element Q2. The one end of the capacitor C1 is an input terminal of the booster circuit 56. That is, the output terminal of the first current amplification circuit 55 and the input terminal of the booster circuit 56 are coupled to each other. The anode terminal of the diode D4 is coupled to the second input terminal 52. The other end of the capacitor C1 is coupled to the cathode terminal of the diode D4. The other end of the capacitor C1 and the cathode terminal of the diode D4 are the output terminal of the booster circuit 56.

In this way, the booster circuit 56 can boost the voltage Vb at the output terminal of the first current amplification circuit 55 to the voltage Vc at the output terminal of the booster circuit 56. Specifically, the booster circuit 56 boosts the input converted signal by, for example, about 12 V. By this, the signal boosted by the booster circuit 56 has a voltage higher than the second voltage range when the signal is at a high level. That is, the booster circuit 56 can boost the converted signal that is within the second voltage range to a voltage higher than a voltage within the second voltage range. For example, the booster circuit 56 can boost a rectangular wave having a high level of about 24 V and a low level of about 12 V to a rectangular wave having a high level of about 36 V and a low level of about 24 V.

First Adjustment Circuit 57

The drive circuit 43 includes a first adjustment circuit 57. The first adjustment circuit 57 is a circuit that adjusts the converted signal boosted by the booster circuit 56 so that the rising time of the converted signal becomes longer. That is, the first adjustment circuit 57 performs adjustment such that the slew rate of the converted signal boosted by the booster circuit 56 is reduced and the rising of the converted signal boosted by the booster circuit 56 is delayed.

The first adjustment circuit may include a resistance R7 as an example of a predetermined resistance. One end of the resistance R7 is coupled to the other end of the capacitor C1 and the cathode terminal of the diode D4. The one end of the resistance R7 is an input terminal of the first adjustment circuit 57. That is, the output terminal of the booster circuit 56 and the input terminal of the first adjustment circuit 57 are coupled to each other. The other end of the resistance R7 is an output terminal of the first adjustment circuit 57.

When the resistance value of the resistance R7 is small, the power consumption increases, and when the resistance value of the resistance R7 is large, the distortion of the waveform increases. For this reason, a suitable resistance value is adopted for the resistance R7 so that the power consumption does not increase and the waveform distortion does not increase. The resistance R7 has a resistance value suitable for the standard of the first switching element M1 (to be described later).

Push-Pull Circuit 58

The drive circuit 43 includes a push-pull circuit 58. The push-pull circuit 58 is a circuit that amplifies the current of the converted signal that was adjusted by the first adjustment circuit 57. The push-pull circuit 58 is a circuit that outputs the amplified converted signal as a drive signal to the transmission element 38. That is, the push-pull circuit 58 is a circuit that outputs, to the transmission element 38, a drive signal obtained by amplifying the current of the converted signal that was adjusted by the first adjustment circuit 57.

The push-pull circuit 58 includes a first switching element M1 and a second switching element M2. The first switching element M1 is an N-type MOSFET. The second switching element M2 is an N-type MOSFET. That is, the push-pull circuit 58 is a push-pull circuit using two N-type MOSFETs.

In the present embodiment, the first switching element M1 corresponds to an example of a first N-type MOSFET. In the present embodiment, the second switching element M2 corresponds to an example of a second N-type MOSFET. The push-pull circuit 58 may include a first gate resistance R1, a second gate resistance R2, and diodes D1 and D2.

One end of the first gate resistance R1 is coupled to the other end of the resistance R7. The one end of the first gate resistance R1 is a first input terminal of the push-pull circuit 58. That is, the output terminal of the first adjustment circuit 57 and the first input terminal of the push-pull circuit 58 are coupled to each other. The other end of the first gate resistance R1 is coupled to the gate terminal of the first switching element M1. That is, the first gate resistance R1 is coupled to the gate terminal of the first switching element M1. The drain terminal of the first switching element M1 is coupled to the second input terminal 52. The source terminal of the first switching element M1 and drain terminal of the second switching element M2 are coupled to each other. The source terminal of the first switching element M1 and the drain terminal of the second switching element M2 are coupled to the output terminal 53. One end of the second gate resistance R2 is coupled to the first input terminal 51. The one end of the second gate resistance R2 is a second input terminal of the push-pull circuit 58. A reference signal Vin1 is input to the one end of the second gate resistance R2. The other end of the second gate resistance R2 is coupled to the gate terminal of the second switching element M2. That is, the second gate resistance R2 is coupled to the gate terminal of the second switching element M2. A drain terminal of the second switching element M2 is grounded.

An anode terminal of the diode D1 is coupled to a source terminal of the first switching element M1. A cathode terminal of the diode D1 and a gate terminal of the first switching element M1 are coupled to each other. The diode D1 between the source terminal of the first switching element M1 and the gate terminal of the first switching element M1, protects the absolute maximum rating between the source terminal of the first switching element M1 and the gate terminal of the first switching element M1. In the present embodiment, the diode D1 corresponds to an example of a protection circuit.

The anode terminal of the diode D2 is coupled to the source terminal of the second switching element M2. The cathode terminal of the diode D2 and the gate terminal of the second switching element M2 are coupled to each other. The diode D2 in between the source terminal of the second switching element M2 and the gate terminal of the second switching element M2, protects the absolute maximum rating between the source terminal of the second switching element M2 and the gate terminal of the second switching element M2.

As described above, the converted signal adjusted by the first adjustment circuit 57 is input to the first input terminal of the push-pull circuit 58. That is, the converted signal that was adjusted by the first adjustment circuit 57 is input to the gate terminal of the first switching element M1 via the first gate resistance R1. The reference signal Vin1 is input to the second input terminal of the push-pull circuit 58. That is, the reference signal Vin1 is input to the gate terminal of the second switching element M2 via the second gate resistance R2. The signal that was adjusted by the first adjustment circuit 57 is a signal obtained by inverting the voltage level compared with the reference signal Vin1. Therefore, the second switching element M2 is in the OFF state when the first switching element M1 is in the ON state, except at turn ON and turn OFF of the first switching element M1 and the second switching element M2. In addition, the second switching element M2 is in the ON state when the first switching element M1 is in the OFF state, except at turn ON and turn OFF of the first switching element M1 and the second switching element M2.

By this, the push-pull circuit 58 uses the two N-type MOSFETs to amplify the current of the converted signal that was adjusted by the first adjustment circuit 57. The push-pull circuit 58 outputs the amplified signal as a drive signal from an output terminal 53.

Second Adjustment Circuit 59

The drive circuit 43 includes a second adjustment circuit 59. The second adjustment circuit 59 is a circuit that adjusts the converted signal input to the push-pull circuit 58. Specifically, the second adjustment circuit 59 adjusts the falling timing of the converted signal input to the gate terminal of the first switching element M1 to be earlier. In the present embodiment, the third switching element M3 corresponds to an example of a third N-type MOSFET.

The second adjustment circuit 59 includes the third switching element M3. The second adjustment circuit 59 may include the third gate resistance R3, the diode D3, and a diode D5. The third switching element M3, the third gate resistance R3, and the diode D3 may be shared by the conversion circuit 54 and the second adjustment circuit 59. An anode terminal of the diode D5 is coupled to the other end of the resistance R7 and to the one end of the first gate resistance R1. In other words, the anode terminal of the diode D5 is coupled to the output terminal of the first adjustment circuit 57 and the first input terminal of the push-pull circuit 58. A cathode terminal of the diode D5 and the drain terminal of the third switching element M3 are coupled to each other. That is, the gate terminal of the first switching element M1 and the drain terminal of the third switching element M3 are coupled to each other via the first gate resistance R1 and the diode D5.

Relationship Between Switching Element and Gate Resistance

In particular, the third switching element M3 has a smaller total gate charge amount than that of the second switching element M2. The first switching element M1 and the second switching element M2 may have the same total gate charge amount. The third gate resistance R3 has a resistance value smaller than that of the second gate resistance R2. The first gate resistance R1 and the third gate resistance R3 may have the same resistance value.

In this way, before the second switching element M2 changes from the OFF state to the ON state, the third switching element M3 changes from the OFF state to the ON state. Also, before the second switching element M2 changes from the OFF state to the ON state, the first switching element M1 changes from the ON state to the OFF state. That is, the third switching element M3 is driven so as to advance the falling timing of the converted signal to be input to the gate terminal of the first switching element M1. Thus, by making it so the second switching element M2 does not switch from the OFF state to the ON state before the first switching element M1 switches from the ON state to the OFF state, it is possible to prevent a shoot-through current from flowing from the first switching element M1 to the second switching element M2.

Operation of First Embodiment

The operation of the first embodiment will be described.

Figure 5:
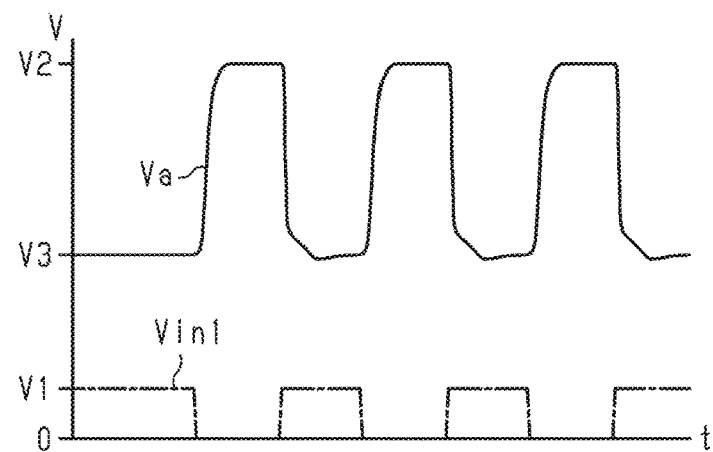
FIG. 5 is a schematic diagram showing input and output voltages of a conversion circuit.

As shown in FIG. 5, the rectangular wave reference signal Vin1, whose amplitude is the first power supply voltage V1, is input to the first input terminal 51 of the drive circuit 43. The drive power supply Vin2 of the second power supply voltage V2 is supplied to the second input terminal 52.

When the reference signal Vin1 input to the gate terminal of the third switching element M3 is at a high level, the third switching element M3 is in the ON state, and the voltage Va at the output terminal of the conversion circuit 54 is at a voltage V3, which is lower than the second power supply voltage V2. When the reference signal Vin1 is at a low level, the third switching element M3 is in the OFF state, and the voltage Va at the output terminal of the conversion circuit 54 becomes the second power supply voltage V2. That is, the reference signal Vin1 is converted into the converted signal whose voltage level is inverted compared with the reference signal Vin1.

Figure 6:
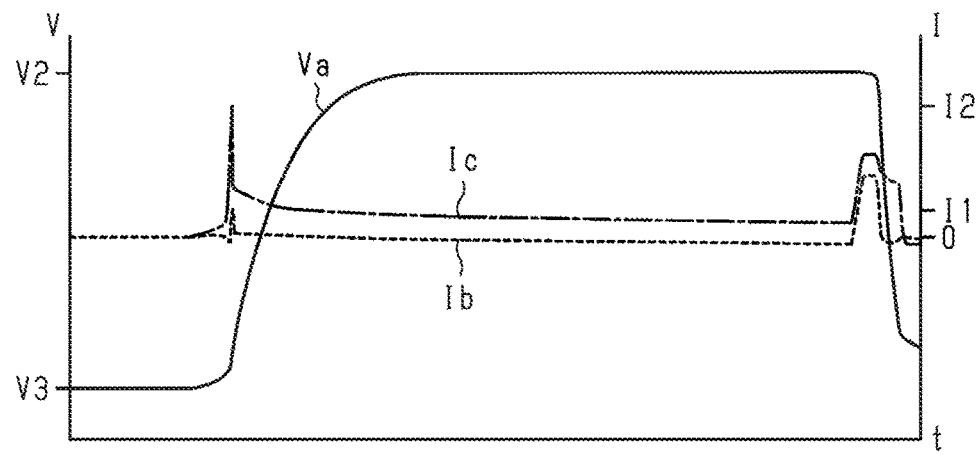
FIG. 6 is a schematic diagram showing input/output currents of a current amplification circuit.

As shown in FIG. 6, the current of the converted signal output from the output terminal of the conversion circuit 54 is amplified by the first current amplification circuit 55. To be specific, during rise of the voltage Va at the output terminal of the conversion circuit 54, the current Ib flowing through the input terminal of the first current amplification circuit 55 is the current I1, but the current Ic flowing through the output terminal of the first current amplification circuit 55 becomes the current I2. That is, the current Ib flowing through the input terminal of the first current amplification circuit 55 is amplified to the current Ic flowing through the output terminal of the first current amplification circuit 55.

Figure 7:
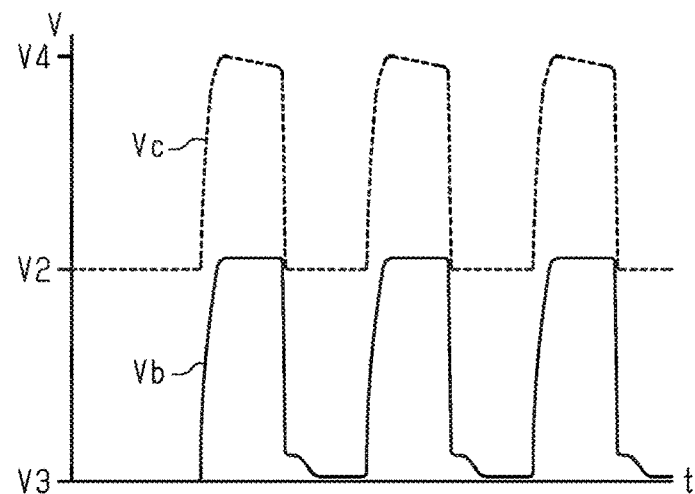
FIG. 7 is a schematic diagram showing input and output voltages of a booster circuit.

As shown in FIG. 7, the converted signal output from the output terminal of the first current amplification circuit 55 is boosted by the booster circuit 56. As a result, the high level of the voltage Vc at the output terminal of the booster circuit 56 becomes the voltage V4, and the low level thereof becomes the second power supply voltage V2. Concretely, the voltage Vb at the input terminal of the booster circuit 56 is, for example, about 24 V at the high level and about 12 V at the low level, and the voltage Vc at the output terminal of the booster circuit 56 is, for example, about 36 V at the high level and about 24 V at the low level.

Figure 8:
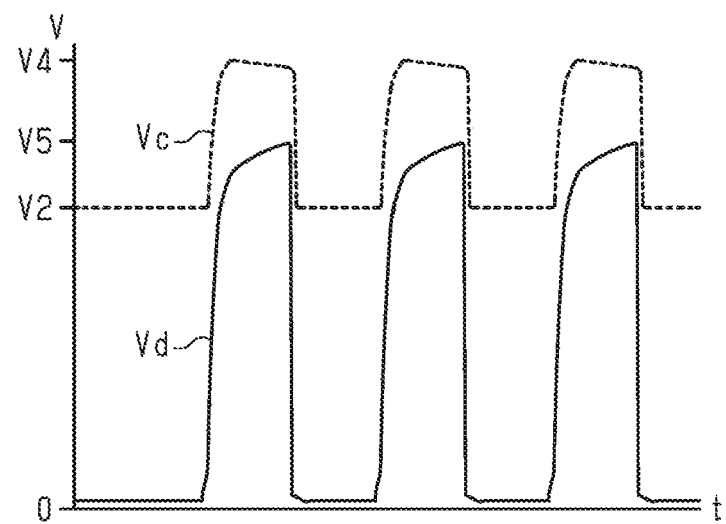
FIG. 8 is a schematic diagram showing input and output voltages of a first adjustment circuit.

As shown in FIG. 8, the converted signal output from the output terminal of the booster circuit 56 is adjusted by the first adjustment circuit 57. Specifically, the voltage Vd at the output terminal of the first adjustment circuit 57 has a waveform with a long rising time. Further, the high level of the voltage Vd at the output terminal of the first adjustment circuit 57 becomes voltage V5, and the low level becomes about 0 V. For example, the voltage Vd at the output terminal of the first adjustment circuit 57 has a high level of about 28 V.

Figure 9:
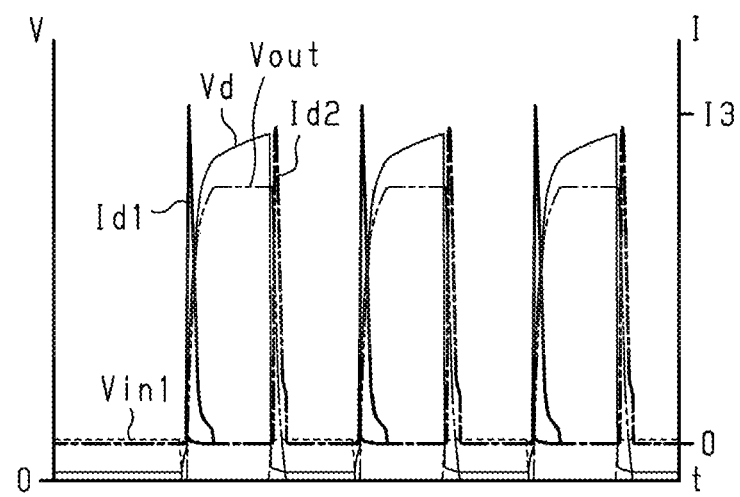
FIG. 9 is a schematic diagram showing input/output voltages and drain currents of a push-pull circuit.

As shown in FIG. 9, the reference signal Vin1 is input to the gate terminal of the second switching element M2 via the second gate resistance R2. The converted signal outputted from the output terminal of the first adjustment circuit 57 is inputted to the gate terminal of the first switching element M1 via the first gate resistance R1. When the signal outputted from the output terminal of the first adjustment circuit 57 is at a high level, the reference signal Vin1 is at a low level. When the signal outputted from the output terminal of the first adjustment circuit 57 is at a low level, the reference signal Vin1 is at a high level.

When the first switching element M1 switches from the OFF state to the ON state, the drain current Id1 of the first switching element M1 becomes a current I3, which is larger than the current I2. When the second switching element M2 switches from the OFF state to the ON state, the drain current Id2 of the second switching element M2 becomes the current I3, which is larger than the current I2. That is, the drain current Id1 of the first switching element M1 and the drain current Id2 of the second switching element M2 are both amplified to the maximum current I3. In this way, the drive signal Vout whose current is amplified by the push-pull circuit 58 is output from the output terminal 53.

Figure 10:
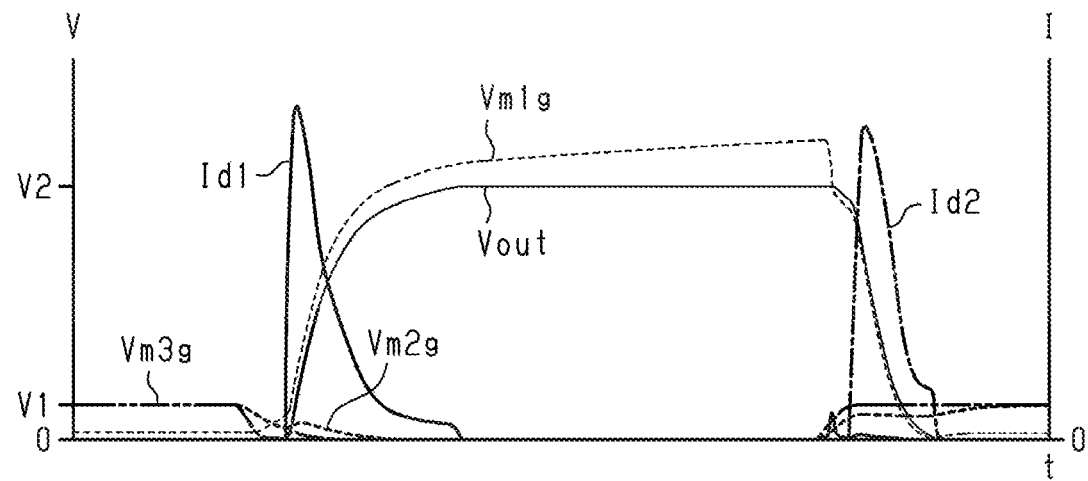
FIG. 10 is a schematic diagram showing an input/output voltage and a drain current of the push-pull circuit and an input voltage to a second adjustment circuit.
Figure 11:
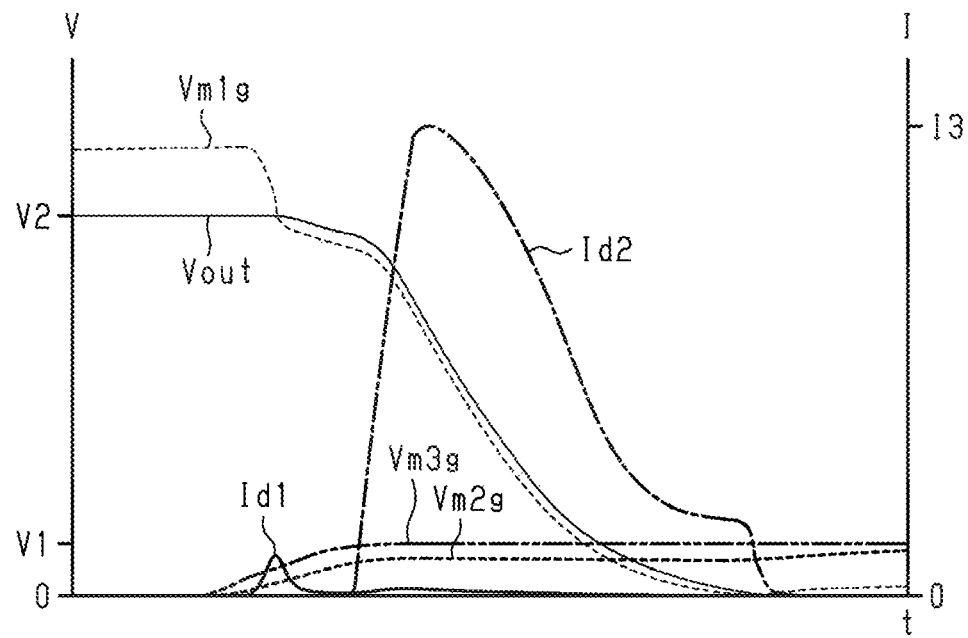
FIG. 11 is a schematic diagram showing an input/output voltage and a drain current of the push-pull circuit and an input voltage to a second adjustment circuit.

As shown in FIGS. 10 and 11, the reference signal Vin1 is also input to the gate terminal of the third switching element M3 via the third gate resistance R3. The third switching element M3 has a smaller total gate charge amount than that of the second switching element M2. Therefore, the gate terminal voltage Vm3g of the third switching element M3 becomes a high level earlier than the gate terminal voltage Vm2g of the second switching element M2. That is, the third switching element M3 changes from the OFF state to the ON state earlier than does the second switching element M2.

The third gate resistance R3 of the third switching element M3 has a smaller resistance value than does the second gate resistance R2 of the second switching element M2. Therefore, the gate terminal voltage Vm3g of the third switching element M3 becomes a high level earlier than the gate terminal voltage Vm2g of the second switching element M2. That is, the third switching element M3 changes from the OFF state to the ON state earlier than does the second switching element M2.

In this way, when the third switching element M3 switches from the OFF state to the ON state earlier than does the second switching element M2, a drain current flows through the third switching element M3. As a result, the gate terminal voltage Vm1g of the first switching element M1 decreases. That is, the first switching element M1 changes from the ON state to the OFF state before the second switching element M2 changes from the OFF state to the ON state. Thus, the drain current Id1 of the first switching element M1 stops flowing before the drain current Id2 of the second switching element M2 starts to flow, and it is possible to prevent a shoot-through current from flowing from the first switching element M1 to the second switching element M2.

Effects of First Embodiment

Effects of the first embodiment will be described.

(1) The push-pull circuit 58 includes the first switching element M1, which is an N-type MOSFET, and the second switching element M2, which is an N-type MOSFET. The push-pull circuit 58 is a circuit in which the source terminal of the first switching element M1 and drain terminal of the second switching element M2 are coupled to each other. A converted signal, whose voltage level is inverted compared with the reference signal Vin1, is input to the gate terminal of the first switching element M1, and the reference signal Vin1 is input to the gate terminal of the second switching element M2. Therefore, the current can be amplified by the push-pull circuit 58 using the N-type MOSFET, and the driving speed can be increased compared with that of a push-pull circuit using a P-type MOSFET.

Further, the current can be amplified by the push-pull circuit 58 using the N-type MOSFET, and the push-pull circuit can be configured at a lower cost than a push-pull circuit using a P-type MOSFET.

Further, by making the falling timing of the converted signal input to the gate terminal of the first switching element M1 earlier, it is possible to suppress a shoot-through current from the first switching element M1 to the second switching element M2.

(2) The reference signal Vin1 that is within the first voltage range equal to or lower than the first power supply voltage V1, can be converted into a converted signal that is within the second voltage range equal to or lower than the second power supply voltage V2, which is higher than the first power supply voltage V1, and can be further boosted to a voltage higher than the second voltage range. Therefore, the reference signal Vin1 in the first voltage range can be converted into a converted signal having a voltage higher than the second voltage range, and the first switching element M1 having a high driving capability can be used, so that the driving capability of the push-pull circuit can be enhanced.

(3) The first current amplification circuit 55 amplifies the current of the converted signal converted by the conversion circuit 54. Thus, the first switching element M1 having high driving capability can be used, and the driving capability of the push-pull circuit 58 can be enhanced.

(4) The second adjustment circuit 59 includes the third switching element M3, which is an N-type MOSFET. The third switching element M3 has a smaller total gate charge amount than that of the second switching element M2. Therefore, the driving speed of the third switching element M3 is faster than that of the second switching element M2. In this manner, the timing at which the driving of the first switching element M1 ends can be advanced by driving the third switching element M3. Therefore, driving of the first switching element M1 can be completed before the second switching element M2 is driven. Therefore, a shoot-through current from the first switching element M1 to the second switching element M2 can be suppressed.

(5) The third gate resistance R3 has a resistance value smaller than that of the second gate resistance R2. Therefore, the driving speed of the third switching element M3 is faster than that of the second switching element M2. In this manner, the timing at which the driving of the first switching element M1 ends can be advanced by driving the third switching element M3. Therefore, driving of the first switching element M1 can be completed before the second switching element M2 is driven. Therefore, a shoot-through current from the first switching element M1 to the second switching element M2 can be suppressed.

(6) The push-pull circuit 58 includes the diode D1 that protects the absolute maximum rating between the source terminal of the first switching element M1 and the gate terminal of the first switching element M1. Therefore, the absolute maximum rating between the source terminal of the first switching element M1 and the gate terminal of the first switching element M1 can be protected when driving of the first switching element M1 ends.

Second Embodiment

Next, a second embodiment will be described.

In the first embodiment, the drive circuit 43 includes the first current amplification circuit 55, but in the second embodiment, the drive circuit 43 may include a second current amplification circuit separate from the first current amplification circuit 55. In the following description, the same configurations and the same control contents as those of the above-described embodiment are denoted by the same reference numerals, and overlapping description thereof will be omitted or simplified.

Second Adjustment Circuit 60

Figure 12:
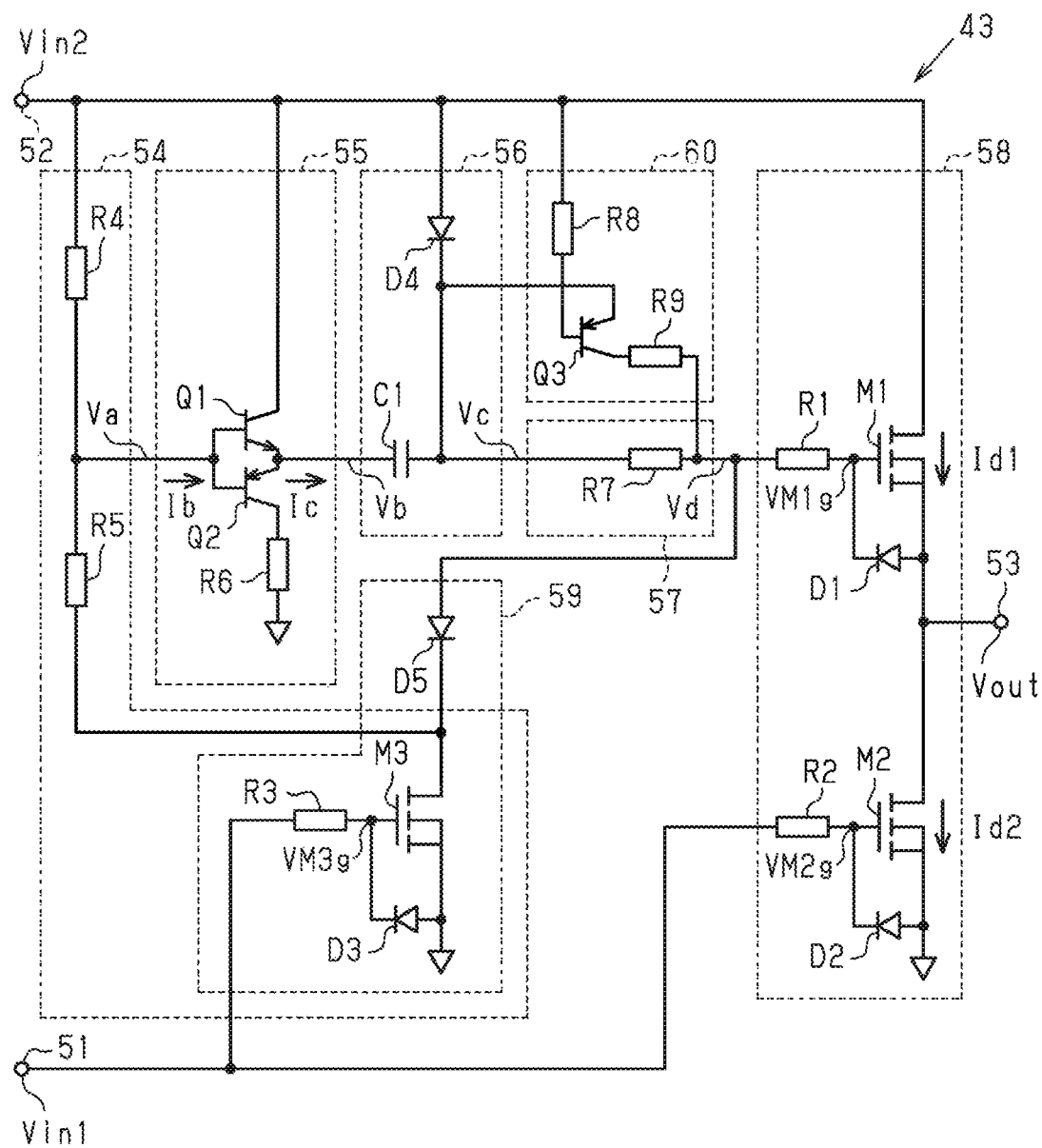
FIG. 12 is a circuit diagram showing a drive circuit.

As shown in FIG. 12, in the second embodiment, the drive circuit 43 may include a second current amplification circuit 60. The second current amplification circuit 60 is coupled to the first input terminal of the push-pull circuit 58 in parallel with the first adjustment circuit 57. The second current amplification circuit 60 is a circuit that amplifies the current of the converted signal input to the first input terminal of the push-pull circuit 58. That is, the second current amplification circuit 60 is a circuit that amplifies the current of the converted signal to be input to the gate terminal of the first switching element M1.

The second current amplification circuit 60 may include resistances R8 and R9 and a switching element Q3. The switching element Q3 is a pnp-type bipolar transistor. One end of the resistance R8 is coupled to the second input terminal 52. The other end of the resistance R8 is coupled to a base terminal of the switching element Q3. An emitter terminal of the switching element Q3 is coupled to a cathode terminal of the diode D4. A collector terminal of the switching element Q3 is coupled to one end of the resistance R9. The other end of the resistance R9 is coupled to the other end of the resistance R7. The other end of the resistance R9 is an output terminal of the second current amplification circuit 60.

In addition, since the drive circuit 43 includes the second current amplification circuit 60, the resistance value of the resistance R7 of the first adjustment circuit 57 can be increased. Thus, the current consumption of the first adjustment circuit 57 can be reduced.

Operation of Second Embodiment

The operation of the second embodiment will be described.

The second current amplification circuit 60 may amplify the current of the converted signal input to the first input terminal of the push-pull circuit 58. Thus, the drive circuit 43 can input a converted signal having a large current to the first input terminal of the push-pull circuit 58. Also, even when the resistance R7 of the first adjustment circuit 57 is increased, the drive circuit 43 can control the current of the converted signal input to the first input terminal of the push-pull circuit 58 to within an allowable range.

Effects of Second Embodiment

Effects of the second embodiment will be described.

(7) The second current amplification circuit 60 amplifies the current of the converted signal input to the push-pull circuit 58. By this, the first switching element M1 having high driving capability can be used, and the driving capability of the push-pull circuit 58 can be enhanced.

Also, since the first adjustment circuit 57 including the resistance R7 and the second current amplification circuit 60 are coupled in parallel, the resistance value of the resistance R7 can be increased. Therefore, the current consumption in the first adjustment circuit 57 can be suppressed.

Modifications

The present embodiment can be modified as follows. The present embodiment and the following modifications can be implemented in combination with each other within a range that is not technically contradictory.

The converted signal converted by the conversion circuit 54 may be a high-level voltage or a low-level voltage as long as the voltage level of the converted signal is inverted compared with that of the reference signal Vin1.

The drive circuit 43 includes the second current amplification circuit 60, but may be a configuration that does not include the first current amplification circuit 55. The drive circuit 43 may be a configuration that does not include the first current amplification circuit 55 and the second current amplification circuit 60.

If the total gate charge amount of the third switching element M3 is smaller than that of the second switching element M2, the third gate resistance R3 and the second gate resistance R2 may have the same resistance value.

As long as the third gate resistance R3 has a smaller resistance value than that of the second gate resistance R2, the third switching element M3 and the second switching element M2 may have the same total gate charge amount.

The total gate charge amount of the first switching element M1 may be smaller than that of the second switching element M2. The first switching element M1 may have a larger total gate charge amount than that of the second switching element M2.

The first gate resistance R1 may have a resistance value smaller than that of the third gate resistance R3. The first gate resistance R1 and the second gate resistance R2 may have the same resistance value.

The cathode terminal of the diode D1 may be coupled to the one end of the first gate resistance R1 instead of being coupled between the gate terminal of the first switching element M1 and the other end of the first gate resistance R1. The cathode terminal of the diode D2 may be coupled to the one end of the second gate resistance R2, instead of between the gate terminal of the second switching element M2 and the other end of the second gate resistance R2. The cathode terminal of the diode D3 may be coupled to the one end of the third gate resistance R3 instead of being coupled between the gate terminal of the third switching element M3 and the other end of the third gate resistance R3.

In the drive circuit 43, various electronic elements such as resistances, capacitors, and diodes may be appropriately added. For example, the second input terminal 52 may be grounded via a capacitor. For example, the second input terminal 52 may be coupled to each circuit via resistance.

The controller 40 may not output the valid signal to the multi-feed detection circuit 41. In this case, the multi-feed detection circuit 41 may continuously generate the reference signal Vin1 after power is turned on, regardless of a signal from the controller 40.

The image reading device 11 may not include the transmission control circuit 42. In this case, one of the drive circuit 43 and the controller 40 may have the function of the transmission control circuit 42. For example, the drive circuit 43 may be input with the first power supply voltage V1 and generate the reference signal Vin1 based on the first power supply voltage V1.

The image reading device 11 may not include the reception amplification circuit 44. The image reading device 11 may not include the reception determination circuit 45. In this case, the controller 40 may have functions of the reception amplification circuit 44 and the reception determination circuit 45.

The disclosure may be applied to a recording device that performs recording on the medium M. That is, the recording device may have a configuration similar to that of the drive circuit 43. In addition, the recording device may include a transport section that transports the medium M. In other words, the present disclosure may be applied to a transport device including a transport section. The transport device may be the image reading device 11 or a recording device, or may be a multifunction peripheral having a recording function, a scanner mechanism, and a copy function. Further, for example, the present disclosure may be applied to an apparatus that does not include a transport section. That is, the present disclosure may be applied to a multi-feed detection device.

The image reading device 11 includes the drive circuit 43 for driving the multi-feed sensor 37, but is not limited thereto. The image reading device 11 may include, for example, a sensor for detecting the thickness of the medium M, and a drive circuit for driving the sensor may include a configuration similar to that of the drive circuit 43. As a specific example, the image reading device 11 may include a sensor for detecting, as the medium M, paper and a card having a thickness larger than that of the paper. That is, the image reading device 11 may be a multi-feed detection device that detects multi-feed of the medium M, or may be a medium detection device that detects the thickness of the medium M. The medium M is not limited to paper, and may be a synthetic resin film, a laminated medium, or the like.

Note

Hereinafter, technical ideas grasped from the above-described embodiment and modified examples, and operation and effects thereof, will be described.

(A) A transmission element configured to transmit a signal for detecting multi-feed of a medium, a reception element configured to receive a signal for detecting multi-feed of the medium, a drive circuit configured to output a drive signal to the transmission element, and a control circuit configured to detect multi-feed of the medium based on a signal received by the reception element, wherein the drive circuit includes a conversion circuit configured to convert a reference signal into a converted signal, a booster circuit configured to boost the converted signal that was converted by the conversion circuit, a first adjustment circuit configured to adjust rising time of the converted signal that was boosted by the booster circuit to be longer, a push-pull circuit that outputs a drive signal obtained by amplifying current of the converted signal that was adjusted by the first adjustment circuit, and a second adjustment circuit configured to adjust the converted signal to be input to the push-pull circuit, the converted signal that was converted by the conversion circuit is a signal whose voltage level is inverted compared with the reference signal, the push-pull circuit includes a first N-type MOSFET and a second N-type MOSFET, and is a circuit wherein a source terminal of the first N-type MOSFET and a drain terminal of the second N-type MOSFET are coupled to each other, the drive circuit is a circuit in which the converted signal that was adjusted by the first adjustment circuit is input to a gate terminal of the first N-type MOSFET and the reference signal is input to a gate terminal of the second N-type MOSFET, and the second adjustment circuit advances a falling timing of the converted signal to be input to the gate terminal of the first N-type MOSFET.

According to this configuration, the push-pull circuit includes the first N-type MOSFET and the second N-type MOSFET, and the source terminal of the first N-type MOSFET and the drain terminal of the second N-type MOSFET are coupled to each other. A converted signal, whose voltage level is inverted compared with the reference signal, is input to the gate terminal of the first N-type MOSFET, and the reference signal is input to the gate terminal of the second N-type MOSFET. Therefore, the current can be amplified by the push-pull circuit using the N-type MOSFET, and the driving speed can be increased compared with that of a push-pull circuit using a P-type MOSFET.

Further, the current can be amplified by the push-pull circuit using the N-type MOSFET, and the push-pull circuit can be configured at a lower cost than a push-pull circuit using a P-type MOSFET.

Further, by advancing the falling timing of the converted signal input to the gate terminal of the first N-type MOSFET to be earlier, it is possible to suppress a shoot-through current from the first N-type MOSFET to the second N-type MOSFET.

(B) The control circuit may be a circuit to which a first power supply voltage is supplied, the drive circuit may be a circuit to which is supplied a second power supply voltage that is higher than the first power supply voltage, the conversion circuit may convert the reference signal, which is within a first voltage range equal to or lower than the first power supply voltage, into the converted signal, which is within a second voltage range equal to or lower than the second power supply voltage and which has a voltage level inverted compared with the reference signal, and the booster circuit may be configured to boost the converted signal converted by the conversion circuit to a voltage higher than the second voltage range.

According to this configuration, the reference signal that is within the first voltage range equal to or lower than the first power supply voltage, can be converted into a converted signal that is within the second voltage range equal to or lower than the second power supply voltage, which is higher than the first power supply voltage, and can be further boosted to a voltage higher than the second voltage range. Therefore, the reference signal in the first voltage range can be converted into a converted signal having a voltage higher than the second voltage range, and the first N-type MOSFET having a high driving capability can be used, so that the driving capability of the push-pull circuit can be enhanced.

(C) The drive circuit may include a first current amplification circuit that amplifies a current of the converted signal that was converted by the conversion circuit.

According to this configuration, by amplifying the current of the converted signal converted by the conversion circuit, an N-type MOSFET having high driving capability can be used, and the driving capability of the push-pull circuit can be enhanced.

(D) The drive circuit may include a second current amplification circuit that amplifies current of the converted signal to be input to the first N-type MOSFET, the first adjustment circuit may have a predetermined resistance, and the second current amplification circuit may be coupled in parallel with the first adjustment circuit.

According to this configuration, by amplifying the current of the converted signal to be input to the push-pull circuit, an N-type MOSFET having high driving capability can be used, and the driving capability of the push-pull circuit can be enhanced.

In addition, since the first adjustment circuit including the predetermined resistance and the second current amplification circuit are coupled in parallel, the resistance value of the predetermined resistance can be increased. Therefore, the current consumption in the first adjustment circuit can be suppressed.

(E) The second adjustment circuit may include a third N-type MOSFET, the drive circuit may be a circuit in which the reference signal is input to a gate terminal of the third N-type MOSFET, the third N-type MOSFET may be driven so that a falling timing of the converted signal to be input to a gate terminal of the first N-type MOSFET is advanced, and the total gate charge amount of the third N-type MOSFET may be smaller than that of the second N-type MOSFET.

According to this configuration, the total gate charge amount of the third N-type MOSFET is smaller than that of the second N-type MOSFET, and the driving speed of the third N-type MOSFET is faster than that of the second N-type MOSFET. In this way, the timing at which the driving of the first N-type MOSFET ends can be advanced to be earlier than that of the driving of the third N-type MOSFET. Therefore, the driving of the first N-type MOSFET can be completed before the second N-type MOSFET is driven. Therefore, a shoot-through current from the first N-type MOSFET to the second N-type MOSFET can be suppressed.

(F) The push-pull circuit may include a first gate resistance coupled to the gate terminal of the first N-type MOSFET, and a second gate resistance coupled to the gate terminal of the second N-type MOSFET, the second adjustment circuit may include a third N-type MOSFET and a third gate resistance coupled to a gate terminal of the third N-type MOSFET, the drive circuit may be a circuit in which the converted signal that was adjusted by the first adjustment circuit is input to the gate terminal of the first N-type MOSFET via the first gate resistance, the reference signal may be input to the gate terminal of the second N-type MOSFET via the second gate resistance, and the reference signal may be input to the gate terminal of the third N-type MOSFET via the third gate resistance, the third N-type MOSFET may be driven so that a falling timing of the converted signal to be input to a gate terminal of the first N-type MOSFET is advanced, and the third gate resistance may have a resistance value smaller than that of the second gate resistance.

According to this configuration, the third gate resistance has a smaller resistance value than the second gate resistance, and the driving speed of the third N-type MOSFET is faster than that of the second N-type MOSFET. In this way, the timing at which the driving of the first N-type MOSFET ends can be advanced to be earlier than that of the driving of the third N-type MOSFET. Therefore, the driving of the first N-type MOSFET can be completed before the second N-type MOSFET is driven. Therefore, a shoot-through current from the first N-type MOSFET to the second N-type MOSFET can be suppressed.

(G) The push-pull circuit may include a protection circuit between the source terminal of the first N-type MOSFET and the gate terminal of the first N-type MOSFET, the protection circuit protecting an absolute maximum rating between the source terminal of the first N-type MOSFET and the gate terminal of the first N-type MOSFET.

According to this configuration, it is possible to protect the absolute maximum rating between the source terminal of the first N-type MOSFET and the gate terminal of the first N-type MOSFET when driving of the first N-type MOSFET ends.

(H) includes the multi-feed detection device according to any one of (A) to (G), and a transport section configured to transport the medium. According to this configuration, the same effects as the above (A) to (G) can be obtained.

(I) includes the multi-feed detection device according to any one of (A) to (G) and a reading section configured to read an image of the medium. According to this configuration, the same effects as the above (A) to (G) can be obtained.

What is claimed is:
1. A multi-feed detection device, comprising:
   a transmission element configured to transmit a signal for detecting multi-feed of a medium;
   a reception element configured to receive a signal for detecting multi-feed of the medium;
   a drive circuit configured to output a drive signal to the transmission element; and
   a control circuit configured to detect multi-feed of the medium based on a signal received by the reception element, wherein
   the drive circuit includes:
      a conversion circuit configured to convert a reference signal into a converted signal,
      a booster circuit configured to boost the converted signal that was converted by the conversion circuit,
      a first adjustment circuit configured to adjust rising time of the converted signal that was boosted by the booster circuit to be longer,
      a push-pull circuit that outputs a drive signal obtained by amplifying current of the converted signal that was adjusted by the first adjustment circuit, and
      a second adjustment circuit configured to adjust the converted signal to be input to the push-pull circuit,
   the converted signal that was converted by the conversion circuit is a signal whose voltage level is inverted compared with the reference signal,
   the push-pull circuit includes a first N-type MOSFET and a second N-type MOSFET, and is a circuit wherein a source terminal of the first N-type MOSFET and a drain terminal of the second N-type MOSFET are coupled to each other,
   the drive circuit is a circuit in which the converted signal that was adjusted by the first adjustment circuit is input to a gate terminal of the first N-type MOSFET and the reference signal is input to a gate terminal of the second N-type MOSFET, and
   the second adjustment circuit advances a falling timing of the converted signal to be input to the gate terminal of the first N-type MOSFET.

2. The multi-feed detection device according to claim 1, wherein
   the control circuit is a circuit to which a first power supply voltage is supplied,
   the drive circuit is a circuit to which is supplied a second power supply voltage that is higher than the first power supply voltage,
   the conversion circuit converts the reference signal, which is within a first voltage range equal to or lower than the first power supply voltage, into the converted signal, which is within a second voltage range equal to or lower than the second power supply voltage and which has a voltage level inverted compared with the reference signal, and
   the booster circuit is configured to boost the converted signal converted by the conversion circuit to a voltage higher than the second voltage range.

3. The multi-feed detection device according to claim 1, wherein
   the drive circuit includes a first current amplification circuit that amplifies a current of the converted signal that was converted by the conversion circuit.

4. The multi-feed detection device according to claim 1, wherein
   the drive circuit includes a second current amplification circuit that amplifies current of the converted signal to be input to the first N-type MOSFET,
   the first adjustment circuit has a predetermined resistance, and
   the second current amplification circuit is coupled in parallel with the first adjustment circuit.

5. The multi-feed detection device according to claim 1, wherein
the second adjustment circuit includes a third N-type MOSFET,
the drive circuit is a circuit in which the reference signal is input to a gate terminal of the third N-type MOSFET,
the third N-type MOSFET is driven so that a falling timing of the converted signal to be input to a gate terminal of the first N-type MOSFET is advanced, and
the total gate charge amount of the third N-type MOSFET is smaller than that of the second N-type MOSFET.

6. The multi-feed detection device according to claim 1, wherein
the push-pull circuit includes a first gate resistance coupled to the gate terminal of the first N-type MOSFET and a second gate resistance coupled to the gate terminal of the second N-type MOSFET,
the second adjustment circuit includes a third N-type MOSFET and a third gate resistance coupled to a gate terminal of the third N-type MOSFET,
the drive circuit is a circuit in which the converted signal that was adjusted by the first adjustment circuit is input to the gate terminal of the first N-type MOSFET via the first gate resistance, the reference signal is input to the gate terminal of the second N-type MOSFET via the second gate resistance, and the reference signal is input to the gate terminal of the third N-type MOSFET via the third gate resistance,
the third N-type MOSFET is driven so that a falling timing of the converted signal to be input to a gate terminal of the first N-type MOSFET is advanced, and
the third gate resistance has a resistance value smaller than that of the second gate resistance.

7. The multi-feed detection device according to claim 1, wherein
the push-pull circuit includes a protection circuit between the source terminal of the first N-type MOSFET and the gate terminal of the first N-type MOSFET, the protection circuit protecting an absolute maximum rating between the source terminal of the first N-type MOSFET and the gate terminal of the first N-type MOSFET.

8. A transport device comprising:
the multi-feed detection device according to claim 1 and a transport section configured to transport the medium.

9. An image reading device comprising:
the multi-feed detection device according to claim 1 and a reading section configured to read an image of the medium.

* * * * *